United States Patent
Adachi et al.

(10) Patent No.: US 11,912,905 B2
(45) Date of Patent: Feb. 27, 2024

(54) ADHESIVE TAPE, METHOD FOR IMMOBILIZING ELECTRONIC DEVICE COMPONENT OR ON-VEHICLE DEVICE COMPONENT, METHOD FOR MANUFACTURING ELECTRONIC DEVICE OR ON-VEHICLE DEVICE

(71) Applicant: SEKISUI CHEMICAL CO., LTD., Osaka (JP)

(72) Inventors: Aya Adachi, Osaka (JP); Yudai Ogata, Osaka (JP); Noriyuki Uchida, Shiga (JP); Yoshito Arai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 18/019,635

(22) PCT Filed: Mar. 22, 2022

(86) PCT No.: PCT/JP2022/013048
§ 371 (c)(1),
(2) Date: Feb. 3, 2023

(87) PCT Pub. No.: WO2022/202778
PCT Pub. Date: Sep. 29, 2022

(65) Prior Publication Data
US 2023/0212441 A1 Jul. 6, 2023

(30) Foreign Application Priority Data
Mar. 22, 2021 (JP) ................. 2021-047310

(51) Int. Cl.
| | | |
|---|---|---|
| *C09J 133/10* | (2006.01) | |
| *C09J 7/30* | (2018.01) | |
| *C08F 220/18* | (2006.01) | |
| *C09J 5/00* | (2006.01) | |

(52) U.S. Cl.
CPC ....... *C09J 133/10* (2013.01); *C08F 220/1808* (2020.02); *C09J 5/00* (2013.01); *C09J 7/30* (2018.01); *C09J 2203/326* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 2010/0151241 A1* | 6/2010 | Hardy | C08F 220/1808 526/318.4 |
| 2012/0171915 A1* | 7/2012 | Bartholomew | C09J 7/385 524/561 |
| 2012/0225983 A1 | 9/2012 | Wagner et al. | |
| 2014/0024754 A1 | 1/2014 | Becker et al. | |
| 2018/0037783 A1* | 2/2018 | Talamoni | C08F 220/1808 |
| 2019/0048132 A1 | 2/2019 | Lundmark et al. | |

FOREIGN PATENT DOCUMENTS

| | | | |
|---|---|---|---|
| CN | 112226164 | | 1/2021 |
| EP | 2 626 397 | | 8/2013 |
| JP | 56-125471 | | 10/1981 |
| JP | 58-46236 | | 10/1983 |
| JP | 7-70534 | | 3/1995 |
| JP | 08209086 | A * | 8/1996 |
| JP | 10-231325 | | 9/1998 |
| JP | 2002-121522 | | 4/2002 |
| JP | 2002129122 | A * | 5/2002 |
| JP | 2006-521418 | | 9/2006 |
| JP | 2008-50563 | | 3/2008 |
| JP | 2009-294573 | | 12/2009 |
| JP | 2010-506979 | | 3/2010 |
| JP | 2011-105829 | | 6/2011 |
| JP | 2013-510200 | | 3/2013 |
| JP | 2013-249322 | | 12/2013 |
| JP | 2014-37543 | | 2/2014 |
| JP | 2014-512342 | | 5/2014 |
| JP | 2015-21067 | | 2/2015 |
| JP | 2015-52050 | | 3/2015 |
| JP | 2015-120876 | | 7/2015 |
| JP | 2015-212326 | | 11/2015 |
| JP | 2017-2225 | | 1/2017 |
| JP | 2017-179329 | | 10/2017 |
| JP | 2018-87334 | | 6/2018 |
| JP | 2018-130934 | | 8/2018 |
| JP | 2018-154832 | | 10/2018 |
| JP | 2020-111741 | | 7/2020 |
| KR | 10-2015-0010646 | | 1/2015 |
| PL | 219947 | | 4/2012 |
| WO | 2005/068521 | | 7/2005 |
| WO | 2008/046000 | | 4/2008 |
| WO | 2013/005470 | | 1/2013 |

OTHER PUBLICATIONS

JP-08209086-A, Aug. 1996, machine translation (Year: 1996).*
JP-2002129122-A, May 2002, machine translation (Year: 2002).*
International Search Report dated Jun. 21, 2022 in International Application No. PCT/JP2022/013048.
International Search Report dated Feb. 22, 2021 in International (PCT) Patent Application No. PCT/JP2020/047202.
International Search Report dated Jun. 21, 2022 in International Application No. PCT/JP2022/013035.
C.E. Rehberg et al., "Preparation and Properties of the n-Alkyl Acrylates", Journal of the American Chemical Society, vol. 66, No. 7, Jul. 1, 1944, pp. 1203-1207.

* cited by examiner

*Primary Examiner* — Satya B Sastri
(74) *Attorney, Agent, or Firm* — WENDEROTH, LIND & PONACK, L.L.P.

(57) ABSTRACT

The present invention aims to provide an adhesive tape capable of exhibiting excellent adhesion to rough surfaces. The present invention also aims to provide a method for fixing an electronic device component or an in-vehicle device component using the adhesive tape and a method for producing an electronic device or an in-vehicle device. Provided is an adhesive tape including an adhesive layer containing an acrylic copolymer, the acrylic copolymer containing 30% by weight or more of a structural unit derived from n-heptyl (meth)acrylate and 0.01% by weight or more and 30% by weight or less of a structural unit derived from 1-methylheptyl (meth)acrylate.

15 Claims, No Drawings

ADHESIVE TAPE, METHOD FOR IMMOBILIZING ELECTRONIC DEVICE COMPONENT OR ON-VEHICLE DEVICE COMPONENT, METHOD FOR MANUFACTURING ELECTRONIC DEVICE OR ON-VEHICLE DEVICE

TECHNICAL FIELD

The present invention relates to an adhesive tape, a method for fixing an electronic device component or an in-vehicle device, and a method for producing an electronic device or an in-vehicle device.

BACKGROUND ART

Adhesive tapes including an adhesive layer containing an adhesive have been widely used to fix components in electronic components, vehicles, houses, and building materials (see Patent Literatures 1 to 3, for example). Specifically, for example, adhesive tapes are used to bond a cover panel for protecting a surface of a portable electronic device to a touch panel module or display panel module, or to bond a touch panel module to a display panel module.

CITATION LIST

Patent Literature

Patent Literature 1: JP 2015-052050 A
Patent Literature 2: JP 2015-021067 A
Patent Literature 3: JP 2015-120876 A

SUMMARY OF INVENTION

Technical Problem

Acrylic adhesives containing acrylic copolymers are widely used in adhesive tapes. Acrylic copolymers are constituted by acrylic monomers, for example, alkyl (meth) acrylates such as butyl (meth)acrylate and 2-ethylhexyl (meth)acrylate. However, although adhesives containing acrylic copolymers that mainly contain these alkyl (meth) acrylates have excellent adhesion to smooth surfaces, they may have poor adhesion to rough surfaces.

The present invention aims to provide an adhesive tape capable of exhibiting excellent adhesion to rough surfaces. The present invention also aims to provide a method for fixing an electronic device component or an in-vehicle device component using the adhesive tape and a method for producing an electronic device or an in-vehicle device.

Solution to Problem

The present invention relates to an adhesive tape including an adhesive layer containing an acrylic copolymer, the acrylic copolymer containing 30% by weight or more of a structural unit derived from n-heptyl (meth)acrylate and 0.01% by weight or more and 30% by weight or less of a structural unit derived from 1-methylheptyl (meth)acrylate.

Herein, (meth)acrylate means acrylate or methacrylate, and (meth)acrylic means acrylic or methacrylic. An acrylic copolymer may be a methacrylic copolymer.

The present invention is described in detail below.

The present inventors investigated why adhesive tapes including an adhesive layer containing an acrylic copolymer have low adhesion to rough surfaces, and found out that the reason is that such an adhesive layer has low conformability to irregularities, or that even if it has high conformability to irregularities, it is too soft with low cohesive force and thus easily peels off. The present inventors further found out that use of an acrylic copolymer containing a structural unit derived from n-heptyl (meth)acrylate and a structural unit derived from 1-methylheptyl (meth)acrylate, each in a specific amount, can increase both the conformability to irregularities and the cohesive force of the adhesive layer, enabling production of an adhesive tape having excellent adhesion to rough surfaces. The inventors thus completed the present invention.

The adhesive tape of the present invention includes an adhesive layer containing an acrylic copolymer.

The acrylic copolymer contains 30% by weight or more of a structural unit derived from n-heptyl (meth)acrylate and 0.01% by weight or more and 30% by weight or less of a structural unit derived from 1-methylheptyl (meth)acrylate. This allows the adhesive tape of the present invention to have excellent adhesion to rough surfaces.

The reason for this is not clear but can be considered as follows. First, the n-heptyl group of n-heptyl (meth)acrylate has an odd carbon number. n-Heptyl groups are thus less likely to cause molecular packing than n-hydrocarbon groups having even carbon numbers. This is considered to allow the resulting acrylic copolymer to have a low glass transition temperature and to easily exhibit flexibility. However, n-heptyl groups, which are linear, tend to have more entanglement points in the resulting acrylic copolymer than branched hydrocarbon groups, leading to limited conformability to irregularities.

1-Methylheptyl (meth)acrylate has a very similar structure to n-heptyl (meth)acrylate, but its 1-methylheptyl group has a branched structure near the backbone. Hence, although 1-methylheptyl (meth)acrylate has high molecular rigidity than linear monomers and causes the resulting acrylic copolymer to have a higher glass transition temperature, it allows the resulting acrylic copolymer to easily exhibit conformability to irregularities because the branched structure inhibits packing of molecules.

Thus, surprisingly, the acrylic copolymer containing a small amount of the structural unit derived from 1-methylheptyl (meth)acrylate in addition to the structural unit derived from n-heptyl (meth)acrylate is considered to enable the adhesive layer to exhibit cohesive force and conformability to irregularities in a balanced manner. This is considered to enable the adhesive tape to have higher adhesion to rough surfaces.

The n-heptyl (meth)acrylate of the structural unit derived from n-heptyl (meth)acrylate may be n-heptyl acrylate or n-heptyl methacrylate, preferably n-heptyl acrylate.

The n-heptyl (meth)acrylate of the structural unit derived from n-heptyl (meth)acrylate may be petroleum-derived n-heptyl (meth)acrylate or bio-derived n-heptyl (meth)acrylate.

The structural unit derived from n-heptyl (meth)acrylate in which the n-heptyl (meth)acrylate contains bio-derived n-heptyl (meth)acrylate is preferred to save petroleum resources and reduce carbon dioxide emissions.

The bio-derived n-heptyl (meth)acrylate can be synthesized by esterifying (meth)acrylic acid with bio-derived n-heptyl alcohol. The bio-derived n-heptyl alcohol can be obtained by cracking raw materials collected from animals or plants (e.g., castor oil-derived ricinoleic acid).

The lower limit of the amount of the structural unit derived from n-heptyl (meth)acrylate in the acrylic copolymer is 30% by weight. When the amount of the structural unit derived from n-heptyl (meth)acrylate is 30% by weight or more, the adhesive tape has higher adhesion to rough surfaces. The lower limit of the amount of the structural unit derived from n-heptyl (meth)acrylate is preferably 48% by weight. The amount of the structural unit derived from n-heptyl (meth)acrylate is more preferably more than 50% by weight. The lower limit is still more preferably 60% by weight, further preferably 70% by weight, still further preferably 80% by weight.

The upper limit of the amount of the structural unit derived from n-heptyl (meth)acrylate is not limited. The upper limit is preferably 99% by weight, more preferably 97% by weight.

The amount of the structural unit derived from n-heptyl (meth)acrylate in the acrylic copolymer can be determined by performing mass spectroscopy and $^1$H-NMR measurement of the acrylic copolymer and calculating the amount of the structural unit from the integrated intensity ratio of a peak of hydrogen derived from n-heptyl (meth)acrylate.

The 1-methylheptyl (meth)acrylate in the structural unit derived from 1-methylheptyl (meth)acrylate may be 1-methylheptyl acrylate or 1-methylheptyl methacrylate, but is preferably 1-methylheptyl acrylate.

The 1-methylheptyl (meth)acrylate in the structural unit derived from 1-methylheptyl (meth)acrylate may consist of a petroleum-derived 1-methylheptyl (meth)acrylate, but preferably contains bio-derived 1-methylheptyl (meth)acrylate. 1-Methylheptyl (meth)acrylate containing bio-derived 1-methylheptyl (meth)acrylate is preferred to save petroleum resources and to reduce carbon dioxide emission as in the case of the above n-heptyl (meth)acrylate.

When the 1-methylheptyl (meth)acrylate in the structural unit derived from 1-methylheptyl (meth)acrylate contains bio-derived 1-methylheptyl (meth)acrylate, the 1-methylheptyl (meth)acrylate is preferably synthesized by esterifying (meth)acrylic acid with bio-derived 1-methylheptyl alcohol.

The bio-derived 1-methylheptyl alcohol can be obtained by cracking raw materials collected from animals or plants (e.g., castor oil-derived ricinoleic acid).

The lower limit of the amount of the structural unit derived from 1-methylheptyl (meth)acrylate in the acrylic copolymer is 0.01% by weight, and the upper limit thereof is 30% by weight. When the amount of the structural unit derived from 1-methylheptyl (meth)acrylate is within the range, the adhesive tape has higher adhesion to rough surfaces. The lower limit of the amount of the structural unit derived from 1-methylheptyl (meth)acrylate is preferably 1% by weight, and the upper limit thereof is preferably 28% by weight. The lower limit is more preferably 5% by weight, and the upper limit is more preferably 25% by weight. The lower limit is still more preferably 10% by weight, and the upper limit is still more preferably 20% by weight.

The amount of the structural unit derived from 1-methylheptyl (meth)acrylate in the acrylic copolymer can be calculated by pyrolysis GC-MS.

Specifically, reference samples containing known amounts of the structural unit derived from 1-methylheptyl (meth)acrylate are subjected to pyrolysis GC-MS measurement. The measured peak heights of 1-octene are used to produce a calibration curve. With the calibration curve, the amount of the structural unit derived from 1-methylheptyl (meth)acrylate can be calculated.

More specifically, first, the calibration curve can be produced as follows. Acrylic copolymers (reference samples) are prepared in which the compounding ratio between n-heptyl (meth)acrylate and 1-methylheptyl (meth)acrylate is adjusted and which contain known amounts of the structural unit derived from 1-methylheptyl (meth)acrylate. The reference samples are weighed out and subjected to pyrolysis GC-MS under the conditions below, whereby the total ion current chromatogram for each reference sample is obtained. The calibration curve can be produced by plotting the amount of the structural unit derived from 1-methylheptyl (meth)acrylate on the horizontal axis and the 1-octene peak intensity in the total ion current chromatogram on the vertical axis. Subsequently, the same amount of the measurement target acrylic copolymer as the amount of the reference samples used for producing the calibration curve is weighed, and subjected to pyrolysis GC-MS measurement under the conditions below. From the 1-octene peak intensity in the obtained total ion current chromatogram and the produced calibration curve, the amount of the structural unit derived from 1-methylheptyl (meth)acrylate is calculated.

<Pyrolysis GC-MS Measurement Conditions>

Device PY-3030D (produced by FRONTIER LAB)
Pyrolysis temperature 550° C.
GC-MS device Agilent 7890B (produced by Agilent Technologies, Inc.) & JMS-Q1500 (produced by JEOL Ltd.)
Inlet temperature 300° C.
Sample amount 0.2 mg, accurately weighed
Column Ultra-ALLOY-1 (non-polar) 0.25 mmφ×30 m×0.25 μm
He flow rate 1.0 mL/min (split ratio 1:50)
Column temperature 40° C. (3 min)–10° C./min–300° C. (5 min)
MS temperature ion source: 230° C., interface: 250° C.
MS measurement range 35 to 600
Ionization method EI method
Measurement mode scan
Ionization voltage 70 eV The acrylic copolymer preferably further contains a structural unit derived from a monomer containing a crosslinkable functional group.

When the acrylic copolymer contains a structural unit derived from a monomer containing a crosslinkable functional group, the adhesive layer has higher cohesive force, and thus the adhesive tape has higher adhesion to rough surfaces.

The monomer containing a crosslinkable functional group is not limited, and may be a monomer containing a hydroxy group, a monomer containing a carboxy group, a monomer containing a glycidyl group, a monomer containing an amide group, or a monomer containing a nitrile group, for example. For easy adjustment of the gel fraction of the adhesive layer, a monomer containing a hydroxy group and a monomer containing a carboxy group are preferred, and a monomer containing a hydroxy group is more preferred.

Examples of the monomer containing a hydroxy group include acrylic monomers containing a hydroxy group such as 4-hydroxybutyl (meth)acrylate and 2-hydroxyethyl (meth)acrylate. Examples of the monomer containing a carboxy group include acrylic monomers containing a carboxy group such as (meth)acrylic acid. Examples of the monomer containing a glycidyl group include acrylic monomers containing a glycidyl group such as glycidyl (meth)acrylate. Examples of the monomer containing an amide group include acrylic monomers containing an amide group such as hydroxyethyl (meth)acrylamide, isopropyl (meth)acrylamide, and dimethylaminopropyl (meth)acrylamide. Examples of the monomer containing a nitrile group include acrylic monomers containing a nitrile group such as (meth)acrylonitrile.

These monomers containing a crosslinkable functional group may be used alone or in combination of two or more thereof.

The amount of the structural unit derived from a monomer containing a crosslinkable functional group in the acrylic copolymer is not limited. The lower limit thereof is preferably 0.01% by weight, and the upper limit thereof is preferably 20% by weight. When the amount of the structural unit derived from a monomer containing a crosslinkable functional group is within the range, the adhesive tape has higher adhesion to rough surfaces. The lower limit of the amount of the structural unit derived from a monomer containing a crosslinkable functional group is more preferably 0.1% by weight, and the upper limit thereof is more preferably 10% by weight. The lower limit is still more preferably 0.5% by weight, and the upper limit is still more preferably 5% by weight.

When the acrylic copolymer contains particularly the structural unit derived from a monomer containing a hydroxy group among structural units derived from a monomer containing a crosslinkable functional group, the amount of the structural unit derived from a monomer containing a hydroxy group in the acrylic copolymer is not limited. The lower limit thereof is preferably 0.01% by weight, and the upper limit thereof is preferably 20% by weight. When the amount of the structural unit derived from a monomer containing a hydroxy group is within the range, the adhesive layer can exhibit cohesive force and conformability to irregularities in a more balanced manner. The lower limit of the amount of the structural unit derived from a monomer containing a hydroxy group is more preferably 0.1% by weight, and the upper limit thereof is more preferably 10% by weight. The lower limit is still more preferably 0.5% by weight, and the upper limit is still more preferably 5% by weight.

The amount of the structural unit derived from a monomer containing a crosslinkable functional group in the acrylic copolymer can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer may contain a structural unit derived from a different monomer other than the structural unit derived from n-heptyl (meth)acrylate, the structural unit derived from 1-methylheptyl (meth)acrylate, and the structural unit derived from a monomer containing a crosslinkable functional group.

The different monomer is not limited. Examples thereof include alkyl (meth)acrylates other than n-heptyl (meth)acrylate and 1-methylheptyl (meth)acrylate.

Examples of the alkyl (meth)acrylates include methyl (meth)acrylate, ethyl (meth)acrylate, propyl (meth)acrylate, n-butyl (meth)acrylate, tert-butyl (meth)acrylate, 2-ethylhexyl (meth)acrylate, n-octyl (meth)acrylate, isooctyl (meth)acrylate, n-nonyl (meth)acrylate, isononyl (meth)acrylate, myristyl (meth)acrylate, cetyl (meth)acrylate, stearyl (meth)acrylate, an ester of 5,7,7-trimethyl-2-(1,3,3-trimethylbutyl)octanol-1 and (meth)acrylic acid, an ester of (meth)acrylic acid and an alcohol having one or two methyl groups in a linear main chain and having a total carbon number of 18, behenyl (meth)acrylate, and arachidyl (meth)acrylate. These alkyl (meth)acrylates may be used alone or in combination of two or more thereof.

The amount (total amount) of structural units derived from an alkyl (meth)acrylate, including the structural unit derived from n-heptyl (meth)acrylate and the structural unit derived from 1-methylheptyl (meth)acrylate, in the acrylic copolymer is not limited. The lower limit thereof is preferably 30% by weight, more preferably 48% by weight. The amount (total amount) of the structural unit derived from an alkyl (meth)acrylate is still more preferably more than 50% by weight. The lower limit is further preferably 60% by weight, still further preferably 70% by weight, even still further preferably 80% by weight.

The upper limit of the amount (total amount) of structural units derived from an alkyl (meth)acrylate is not limited. The upper limit is preferably 99% by weight, more preferably 97% by weight.

Examples of the different monomer also include cyclohexyl (meth)acrylate, isobornyl (meth)acrylate, benzyl (meth)acrylate, 2-butoxyethyl (meth)acrylate, 2-phenoxyethyl (meth)acrylate, tetrahydrofurfuryl (meth)acrylate, and polypropylene glycol mono(meth)acrylate. Examples of the different monomer also include various monomers used for common acrylic polymers, such as vinyl carboxylate (e.g., vinyl acetate) and styrene. These different monomers may be used alone or in combination of two or more thereof.

The acrylic copolymer may contain a structural unit derived from a (meth)acrylate containing an alkyl group having a carbon number of 8 or greater.

The (meth)acrylate containing an alkyl group having a carbon number of 8 or greater is not limited. Examples of such a (meth)acrylate among the above-mentioned (meth)acrylates include 2-ethylhexyl (meth)acrylate, n-octyl (meth)acrylate, isooctyl (meth)acrylate, n-nonyl (meth)acrylate, isononyl (meth)acrylate, myristyl (meth)acrylate, cetyl (meth)acrylate, stearyl (meth)acrylate, an ester of 5,7,7-trimethyl-2-(1,3,3-trimethylbutyl)octanol-1 and (meth)acrylic acid, an ester of (meth)acrylic acid and an alcohol having one or two methyl groups in a linear main chain and having a total carbon number of 18, behenyl (meth)acrylate, and arachidyl (meth)acrylate.

The amount of the structural unit derived from a (meth)acrylate containing an alkyl group having a carbon number of 8 or greater in the acrylic copolymer is not limited. The upper limit thereof is preferably 70% by weight. When the amount of the structural unit derived from a (meth)acrylate containing an alkyl group having a carbon number of 8 or greater is 70% by weight or less, the adhesive tape has higher adhesion to rough surfaces. The upper limit of the amount of the structural unit derived from a (meth)acrylate containing an alkyl group having a carbon number of 8 or greater is more preferably 50% by weight, still more preferably 48.5% by weight, further preferably 40% by weight, particularly preferably 30% by weight.

The lower limit of the amount of the structural unit derived from a (meth)acrylate containing an alkyl group having a carbon number of 8 or greater is not limited, and may be 0% by weight. When the acrylic copolymer contains the structural unit derived from a (meth)acrylate containing an alkyl group having a carbon number of 8 or greater, the lower limit of the amount of the structural unit is preferably 1% by weight, more preferably 5% by weight. In other words, the amount of the structural unit derived from a (meth)acrylate containing an alkyl group having a carbon number of 8 or greater is preferably 1% by weight or more and 70% by weight or less.

The amount of the structural unit derived from a (meth)acrylate containing an alkyl group having a carbon number of 8 or greater in the acrylic copolymer also can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer may contain a structural unit derived from a monomer having a glass transition temperature (Tg) of −35° C. or higher.

When the acrylic copolymer contains the structural unit derived from a monomer having a glass transition temperature (Tg) of −35° C. or higher, the adhesive layer has higher adhesion. The monomer having a glass transition temperature (Tg) of −35° C. or higher herein refers to a monomer whose homopolymer has a glass transition temperature (Tg) of −35° C. or higher. The glass transition temperature (Tg) of the homopolymer can be determined by differential scanning calorimetry, for example.

The glass transition temperature (Tg) of the monomer having a glass transition temperature (Tg) of −35° C. or higher is more preferably −15° C. or higher. The upper limit of the glass transition temperature (Tg) is not limited. The upper limit is preferably 180° C., more preferably 150° C.

The monomer having a glass transition temperature (Tg) of −35° C. or higher is not limited, but is preferably a monomer not containing a crosslinkable functional group. Specific examples thereof include methyl (meth)acrylate, ethyl (meth)acrylate, isopropyl (meth)acrylate, tert-butyl (meth)acrylate, n-butyl methacrylate, isobutyl (meth)acrylate, isobornyl (meth)acrylate, tetrahydrofurfuryl (meth)acrylate, trimethylolpropane formal (meth)acrylate, cyclohexyl (meth)acrylate, benzyl (meth)acrylate, phenoxyethyl (meth)acrylate, acrylamide, dimethylacrylamide, and diethylacrylamide. Preferred among these are isobornyl (meth)acrylate and tetrahydrofurfuryl (meth)acrylate.

The amount of the structural unit derived from a monomer having a glass transition temperature (Tg) of −35° C. or higher in the acrylic copolymer is not limited. The amount is preferably 5% by weight or more and 70% by weight or less. When the amount of the structural unit derived from a monomer having a glass transition temperature (Tg) of −35° C. or higher is 70% by weight or less, the adhesive layer has higher conformability to irregularities. The upper limit of the amount of the structural unit derived from a monomer having a glass transition temperature (Tg) of −35° C. or higher is more preferably 65% by weight, still more preferably 60% by weight, further preferably 55% by weight, particularly preferably 50% by weight.

When the acrylic copolymer contains the structural unit derived from a monomer having a glass transition temperature (Tg) of −35° C. or higher, the lower limit of the amount thereof is preferably 5% by weight, more preferably 10% by weight.

The amount of the structural unit derived from a monomer having a glass transition temperature (Tg) of −35° C. or higher in the acrylic copolymer also can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer preferably contains a structural unit derived from a monomer having a cyclic structure.

When the acrylic copolymer contains the structural unit derived from a monomer having a cyclic structure, the adhesive tape can be suitably used as an optical adhesive tape.

The cyclic structure is not limited. Examples thereof include alicyclic structures, aromatic ring structures, and heterocyclic structures. Examples of monomers having a cyclic structure among the above-described monomers include isobornyl (meth)acrylate, tetrahydrofurfuryl (meth)acrylate, trimethylolpropane formal (meth)acrylate, cyclohexyl (meth)acrylate, benzyl (meth)acrylate, and phenoxyethyl (meth)acrylate. Preferred among these are isobornyl (meth)acrylate, tetrahydrofurfuryl (meth)acrylate, and trimethylol propane formal(meth)acrylate. Bio-derived monomers are particularly preferred. Bio-derived isobornyl (meth)acrylate, bio-derived tetrahydrofurfuryl (meth)acrylate, and bio-derived trimethylol propane formal (meth) acrylate are more preferred.

The monomer containing a crosslinkable functional group and the different monomer each preferably contain a bio-derived monomer, but may consist of a petroleum-derived monomer.

Theoretically, all the acrylic monomers constituting the acrylic copolymer may be bio-derived. From the viewpoint of the cost and production efficiency of the adhesive tape, a comparatively inexpensive, easily available bio-derived monomer may be used, and this monomer may be used in combination with a petroleum-derived monomer.

The glass transition temperature (Tg) of the acrylic copolymer is not limited. The glass transition temperature (Tg) is preferably −20° C. or lower. When the acrylic copolymer has a glass transition temperature (Tg) of −20° C. or lower, the conformability of the adhesive layer to irregularities is improved, leading to higher adhesion of the adhesive tape to rough surfaces. The glass transition temperature (Tg) of the acrylic copolymer is more preferably −30° C. or lower, still more preferably −40° C. or lower, further preferably −50° C. or lower. The lower limit of the glass transition temperature (Tg) of the acrylic copolymer is not limited, and is usually −90° C. or higher, preferably −80° C. or higher.

The glass transition temperature (Tg) of the acrylic copolymer can be measured by differential scanning calorimetry, for example.

The weight average molecular weight of the acrylic copolymer is not limited. The lower limit thereof is preferably 200,000, and the upper limit thereof is preferably 2,000,000. When the weight average molecular weight of the acrylic copolymer is within the range, the adhesive tape has higher adhesion to rough surfaces. The lower limit of the weight average molecular weight of the acrylic copolymer is more preferably 400,000, and the upper limit thereof is more preferably 1,800,000. The lower limit is still more preferably 500,000, and the upper limit is still more preferably 1,500,000. When the weight average molecular weight of the acrylic copolymer is 500,000 or greater, the adhesive tape has higher adhesion, particularly higher holding power when the tape is under a load in a shear direction at high temperature.

The weight average molecular weight is a standard polystyrene equivalent weight average molecular weight determined by gel permeation chromatography (GPC) measurement. Specifically, the acrylic copolymer is diluted 50-fold with tetrahydrofuran (THF). The obtained dilution was filtered through a filter (material: polytetrafluoroethylene, pore size: 0.2 μm) to prepare a measurement sample. Next, this measurement sample is fed to a gel permeation chromatograph (produced by Waters, product name "2690 Separation Model" or its equivalent product), and subjected to GPC measurement at a sample flow rate of 1 mL/min and a column temperature of 40° C. The polystyrene equivalent molecular weight of the acrylic copolymer is measured, and this value is used as the weight average molecular weight of the acrylic copolymer.

The acrylic copolymer can be obtained by radical reaction of a monomer mixture as a raw material in the presence of a polymerization initiator.

The method for radical reaction is not limited. Examples of the polymerization method include living radical polymerization and free radical polymerization. Living radical polymerization can produce a copolymer having a more uniform molecular weight and a more uniform composition compared with free radical polymerization, and can reduce formation of low molecular weight components and the like. This increases the cohesive force of the adhesive layer, leading to higher adhesion of the adhesive tape to rough surfaces.

The polymerization method is not limited and a conventionally known method may be used. Examples thereof include solution polymerization (boiling point polymerization or constant temperature polymerization), UV polymerization, emulsion polymerization, suspension polymerization, and bulk polymerization. Preferred among these are solution polymerization and UV polymerization because these methods enable the adhesive tape to have higher adhesion to rough surfaces. More preferred is solution polymerization because the resulting acrylic copolymer is easily mixed with a tackifier resin, allowing the adhesive tape to have even higher adhesion.

In the case of using solution polymerization as the polymerization method, examples of a reaction solvent include ethyl acetate, toluene, methyl ethyl ketone, dimethyl sulfoxide, ethanol, acetone, and diethyl ether. These reaction solvents may be used alone or in combination of two or more thereof.

The polymerization initiator is not limited. Examples thereof include organic peroxides and azo compounds. Examples of the organic peroxides include 1,1-bis(t-hexylperoxy)-3,3,5-trimethylcyclohexane, t-hexyl peroxypivalate, t-butyl peroxypivalate, 2,5-dimethyl-2,5-bis(2-ethylhexanoylperoxy)hexane, t-hexyl peroxy-2-ethylhexanoate, t-butyl peroxy-2-ethylhexanoate, t-butyl peroxyisobutyrate, t-butyl peroxy-3,5,5-trimethylhexanoate, and t-butyl peroxylaurate. Examples of the azo compounds include azobisisobutyronitrile and azobiscyclohexanecarbonitrile. These polymerization initiators may be used alone or in combination of two or more thereof.

Examples of the polymerization initiator for living radical polymerization include organotellurium polymerization initiators. Any organotellurium polymerization initiator usually used in living radical polymerization may be used. Examples thereof include organotellurium compounds and organotelluride compounds. Here, also in living radical polymerization, an azo compound may be used as a polymerization initiator in addition to the organotellurium polymerization initiator so as to promote the polymerization rate.

The adhesive layer preferably does not contain a surfactant.

When the adhesive layer does not contain a surfactant, the adhesive tape has higher adhesion particularly at high temperature. That the adhesive layer does not contain a surfactant means that the adhesive layer has a surfactant content of 3% by weight or less, preferably 1% by weight or less.

For the adhesive layer not to contain a surfactant, the acrylic copolymer is preferably produced without using a surfactant. For this, solution polymerization or UV polymerization, for example, may be used as the polymerization method for producing the acrylic copolymer.

The surfactant content can be determined by measurement on the adhesive layer using a liquid chromatography mass spectrometer (e.g., NEXCERA produced by Shimadzu Corporation or Exactive produced by Thermo Fisher Scientific), for example. Specifically, a solution of the adhesive layer in ethyl acetate is filtered through a filter (material: polytetrafluoroethylene, pore size: 0.2 μm). The obtained filtrate (about 10 μL) is injected to a liquid chromatography mass spectrometer for analysis under the conditions below. The surfactant content can be determined from the area ratio of a peak corresponding to the surfactant in the adhesive layer. For analysis, samples in which the adhesive layer has a known surfactant content are preferably prepared for each type of surfactant to form calibration curves showing the relation between the surfactant content and the peak area ratio.

Column: Hypersil GOLD (2.1×150 mm) produced by Thermo Fisher Scientific
Mobile phase: acetonitrile
Column temperature: 40° C.
Flow rate: 1.0 mL/min
Ionization method: ESI
Capillary temperature: 350° C.

The adhesive layer preferably further contains a crosslinking agent so as to appropriately adjust the gel fraction.

The crosslinking agent is not limited. Examples thereof include isocyanate crosslinking agents, aziridine crosslinking agents, epoxy crosslinking agents, and metal chelate crosslinking agents. Preferred among these are isocyanate crosslinking agents because they enable the adhesive layer to have excellent adhesiveness to adherends.

The molecular weight of the crosslinking agent is not limited. From the viewpoint of production, the molecular weight is preferably less than 2,000 and 100 or greater.

The amount of the crosslinking agent is not limited. The lower limit thereof relative to 100 parts by weight of the acrylic copolymer is preferably 0.05 parts by weight, and the upper limit thereof is preferably 7 parts by weight. When the amount of the crosslinking agent is within the range, the gel fraction of the adhesive layer can be appropriately adjusted, allowing the adhesive tape to have higher adhesion to rough surfaces. The lower limit of the amount of the crosslinking agent is more preferably 0.1 parts by weight, and the upper limit thereof is more preferably 5 parts by weight.

Here, the amount of the crosslinking agent refers to the amount of the solids of the crosslinking agent.

The adhesive layer preferably further contains a tackifier resin. When the adhesive layer contains a tackifier resin, the adhesive tape has higher adhesion to rough surfaces.

The tackifier resin is not limited. Examples thereof include rosin ester tackifier resins, terpene tackifier resins, coumarone indene tackifier resins, alicyclic saturated hydrocarbon tackifier resins, C5 petroleum tackifier resins, C9 petroleum tackifier resins, and C5-C9 copolymerized petroleum tackifier resins. These tackifier resins may be used alone or in combination of two or more thereof. In particular, the tackifier resin is preferably at least one selected from the group consisting of rosin ester tackifier resins and terpene tackifier resins.

Examples of the rosin ester tackifier resins include polymerized rosin ester resins and hydrogenated rosin ester resins. Examples of the terpene tackifier resins include terpene resins and terpene phenol resins.

The rosin ester tackifier resin and the terpene tackifier resin are preferably bio-derived. Examples of bio-derived rosin ester tackifier resins include rosin ester tackifier resins derived from natural resins such as pine resin. Examples of bio-derived terpene tackifier resins include terpene tackifier resins derived from plant essential oils.

The amount of the tackifier resin is not limited. The lower limit thereof relative to 100 parts by weight of the acrylic copolymer is preferably 10 parts by weight, and the upper limit thereof is preferably 60 parts by weight. When the amount of the tackifier resin is within the range, the adhesive tape has higher adhesion to rough surfaces. The lower limit of the amount of the tackifier resin is more preferably 15 parts by weight, and the upper limit thereof is more preferably 50 parts by weight, still more preferably 35 parts by weight.

The adhesive layer may contain an additive such as a silane coupling agent, a plasticizer, a softener, a filler, a pigment, or a dye, as needed.

The adhesive layer preferably has a bio-derived carbon content of 10% by weight or more. A bio-derived carbon content of 10% by weight or more is an indicator of a "bio-based product". The bio-derived carbon content of 10% by weight or more is preferred for saving petroleum resources or reducing carbon dioxide emissions. The lower limit of the bio-derived carbon content is more preferably 40% by weight or more, still more preferably 60% by weight. The upper limit of the bio-derived carbon content is not limited, and may be 100% by weight.

While bio-derived carbon contains a certain proportion of radioisotope (C-14), petroleum-derived carbon hardly contains C-14. Thus, the bio-derived carbon content can be calculated by measuring the C-14 concentration in the adhesive layer. Specifically, the bio-derived carbon content can be measured in conformity with ASTM D6866-20, a standard widely used in the bioplastics industry.

The gel fraction of the adhesive layer is not limited. The lower limit thereof is preferably 5% by weight, and the upper limit thereof is preferably 70% by weight. When the gel fraction is within the above range, the adhesive layer has both high conformability to irregularities and high cohesive force, allowing the adhesive tape to have higher adhesion to rough surfaces. The lower limit of the gel fraction is more preferably 10% by weight, and the upper limit thereof is more preferably 60% by weight.

The gel fraction is measured as follows.

The adhesive tape is cut to a 20 mm×40 mm flat rectangular shape to prepare a specimen. The specimen is immersed in ethyl acetate at 23° C. for 24 hours, then taken out of the ethyl acetate, and dried at 110° C. for 1 hour. The weight of the specimen after drying is measured, and the gel fraction is calculated by the following equation (1). The specimen includes no release film for protecting the adhesive layer.

$$\text{Gel fraction (\% by weight)} = 100 \times (W_2 - W_0)/(W_1 - W_0) \quad (1)$$

($W_0$: the weight of the substrate (PET film), $W_1$: the weight of the specimen before immersion, $W_2$: the weight of the specimen after immersion and drying)

The thickness of the adhesive layer is not limited. The lower limit thereof is preferably 3 μm, and the upper limit thereof is preferably 300 μm. When the thickness of the adhesive layer is within the above range, the adhesive tape has higher adhesion to rough surfaces. The lower limit of the thickness of the adhesive layer is more preferably 5 μm, still more preferably 10 μm. The upper limit of the thickness of the adhesive layer is more preferably 200 μm, still more preferably 100 μm.

The adhesive tape of the present invention may be a non-support tape including no substrate, a one-sided adhesive tape including the adhesive layer on one surface of a substrate, or a double-sided adhesive tape including the adhesive layers on both surfaces of a substrate.

The substrate is not limited, and may be a conventionally known substrate. To increase the bio-derived material content of the adhesive tape as a whole, a bio-derived substrate is preferably used.

Examples of the bio-derived substrate include films and nonwoven fabrics containing polyesters (PES) such as plant-derived polyethylene terephthalate (PET), plant-derived polyethylene furanoate (PEF), plant-derived polylactic acid (PLA), plant-derived polytrimethylene terephthalate (PTT), plant-derived polybutylene terephthalate (PBT), and plant-derived polybutylene succinate (PBS). Examples also include films and nonwoven fabrics containing plant-derived polyethylene (PE), plant-derived polypropylene (PP), plant-derived polyurethane (PU), plant-derived triacetylcellulose (TAC), plant-derived cellulose, and plant-derived polyamide (PA).

From the viewpoint of substrate strength, the substrate is preferably a film containing PES or a film containing PA. From the viewpoint of heat resistance and oil resistance, the substrate is preferably a film containing PA.

Examples of the constituent of the film containing PA include nylon 11, nylon 1010, nylon 610, nylon 510, and nylon 410, which are made from castor oil, and nylon 56, which is made from cellulose.

To use less new petroleum resources and emit less carbon dioxide to reduce environmental load, the substrate may contain recycled resources. The method for recycling resources may involve, for example, collecting waste of packaging containers, home appliances, automobiles, building materials, or food, or waste generated during production processes, and subjecting the recovered material to washing, decontamination, or decomposition by heating or fermentation for reuse as a raw material. Examples of the substrate containing recycled resources include films and non-woven fabrics containing PET, PBT, PE, PP, PA, or the like made from resin recycled from collected plastic. The collected waste may be burned to utilize the heat energy in production of the substrate or raw materials thereof. Fats and oils contained in the collected waste may be added to petroleum, and the fractionated or refined products thereof may be used as raw materials.

The substrate may be a foam substrate to improve compression characteristics.

The foam substrate preferably contains PE, PP and/or PU. To achieve both high flexibility and high strength, the foam substrate more preferably contains PE. Examples of the constituent of the foam substrate containing PE include PE made from sugarcane.

The foam substrate may be produced by any method. A preferred method includes preparing a foamable resin composition containing a foaming agent and a PE resin containing PE made from sugarcane, foaming the foaming agent while extruding the foamable resin composition into a sheet using an extruder, and optionally crosslinking the obtained polyolefin foam.

The thickness of the foam substrate is not limited. The lower limit thereof is preferably 50 μm and the upper limit thereof is preferably 1,000 μm. When the thickness of the foam substrate is within this range, the adhesive tape can exhibit high shock resistance while exhibiting high flexibility to closely fit the shape of an adherend in bonding. The upper limit of the thickness of the foam substrate is more preferably 300 μm.

The lower limit of the total thickness of the adhesive tape of the present invention (total thickness of the substrate and the adhesive layer(s)) is preferably 3 μm, and the upper limit thereof is preferably 1,200 μm. When the total thickness of the adhesive tape is within the range, the adhesive tape has higher adhesion to rough surfaces. The upper limit of the total thickness of the adhesive tape of the present invention is more preferably 500 μm.

The lower limit of the 180° peeling force of the adhesive tape of the present invention for a SUS304-BA plate measured in conformity with JIS Z 0237:2009 is preferably 5 N/25 mm, more preferably 7 N/25 mm. The upper limit of the 180° peeling force is not limited; the higher it is, the better. The upper limit is practically about 25 N/25 mm.

The 180° peeling force for a SUS304-BA plate is measured in conformity with JIS Z 0237:2009 as follows. First, the adhesive tape is cut to a size of 25 mm wide×75 mm long to prepare a specimen. This specimen is placed on a SUS304-BA plate with the adhesive layer facing the SUS304-BA plate. A 2-kg rubber roller is then moved back and forth once on the specimen at a speed of 300 mm/min to bond the specimen and the SUS304-BA plate together. The specimen is then left to stand at 23° C. and a humidity of 50% for 20 minutes to prepare a test sample. The adhesive tape and the SUS304-BA plate of the test sample are peeled apart in the 180° direction at a tensile speed of 300 mm/min under the conditions of 23° C. and a humidity of 50% in conformity with JIS Z 0237:2009, and the peeling force (N/25 mm) is measured.

Here, when the adhesive tape is a non-support tape including no substrate or a double-sided adhesive tape having adhesive layers on both surfaces of a substrate, one adhesive layer surface (the side not to be measured) is backed with a polyethylene terephthalate film having a thickness of 23 μm (e.g., FE2002 produced by Futamura Chemical Co., Ltd. or its equivalent product), and then the adhesive tape is bonded to the SUS304-BA plate.

The adhesive tape of the present invention may be produced by any method, and may be produced by a conventionally known production method. For example, a double-sided adhesive tape including a substrate may be produced by the following method.

First, a solution of an adhesive A is prepared by adding a solvent to the acrylic copolymer and optional ingredients such as the crosslinking agent and the tackifier resin. The solution of an adhesive A is applied to a surface of the substrate, and the solvent in the solution is completely removed by drying to form an adhesive layer A. Next, a release film is placed on the formed adhesive layer A such that the release-treated surface of the release film faces the adhesive layer A.

Then, another release film is provided. A solution of an adhesive B prepared in the same manner as above is applied to the release-treated surface of the release film. The solvent in the solution is completely removed by drying. This produces a laminated film including an adhesive layer B formed on a surface of the release film. The obtained laminated film is placed on the rear surface of the substrate on which the adhesive layer A is formed, such that the adhesive layer B faces the rear surface of the substrate. Thus, a laminate is produced. The laminate is pressurized using a rubber roller or the like. This can produce a double-sided adhesive tape in which adhesive layers are on both surfaces of a substrate and release films cover the surfaces of the adhesive layers.

Alternatively, two laminated films may be produced in the same manner as above, and the laminated films may be placed on both surfaces of the substrate such that the adhesive layer of each laminated film faces the substrate. The resulting laminate may be pressurized using a rubber roller or the like. This can produce a double-sided adhesive tape in which adhesive layers are on both surfaces of a substrate and release films cover the surfaces of the adhesive layers.

Alternatively, an adhesive solution prepared in the same manner as above may be applied to the release-treated side of a release film solution, and the solvent in the solution may be completely removed by drying to form an adhesive layer. This adhesive layer then may be placed on the release-treated side of a release film to produce a non-support tape including no substrate.

The adhesive tape of the present invention may be used in any application. As the adhesive tape has excellent adhesion to both smooth surfaces and rough surfaces, the adhesive tape is preferably used for fixing an electronic device component or an in-vehicle device component. Specifically, for example, the adhesive tape of the present invention can be suitably used to bond and fix an electronic device component in a large portable electronic device or bond and fix an in-vehicle device component (e.g., in-vehicle panel).

The present invention also encompasses a method for fixing an electronic device component or an in-vehicle device component including fixing an electronic device component or an in-vehicle device component using the adhesive tape of the present invention. The present invention also encompasses a method for producing an electronic device or an in-vehicle device including the method for fixing an electronic device component or an in-vehicle device component of the present invention. These methods enable firm fixing of an electronic device component or an in-vehicle device component.

Advantageous Effects of Invention

The present invention can provide an adhesive tape capable of exhibiting excellent adhesion to rough surfaces. The present invention can also provide a method for fixing an electronic device component or an in-vehicle device component using the adhesive tape and a method for producing an electronic device or an in-vehicle device.

DESCRIPTION OF EMBODIMENTS

The embodiments of the present invention are more specifically described in the following with reference to examples. These examples are not intended to limit the present invention.

Example 1

(1) Production of Acrylic Copolymer

Ethyl acetate as a polymerization solvent was added into a reaction vessel and bubbled with nitrogen. Subsequently, with nitrogen flowing into the reaction vessel, the reaction vessel was heated to start reflux. A polymerization initiator solution obtained by diluting 0.1 parts by weight of azobisisobutyronitrile as a polymerization initiator 10-fold with ethyl acetate was added into the reaction vessel. Subsequently, 30 parts by weight of n-heptyl acrylate (C7), 1 part by weight of 1-methylheptyl acrylate, 63.9 parts by weight of 2-ethylhexyl acrylate (2-EHA, produced by Mitsubishi Chemical Corporation), 5 parts by weight of acrylic acid (AAc, produced by Nippon Shokubai Co., Ltd.), and 0.1 parts by weight of 2-hydroxyethyl acrylate (2-HEA, produced by Osaka Organic Chemical Industry Ltd.) were dripped over two hours. After dripping was complete, the polymerization initiator solution obtained by diluting 0.1 parts by weight of azobisisobutyronitrile as a polymerization initiator 10-fold with ethyl acetate was added into the reaction vessel again. Polymerization reaction was performed for four hours to give a solution containing an acrylic copolymer.

Here, n-heptyl acrylate (C7) was prepared by esterifying n-heptyl alcohol (produced by Tokyo Chemical Industry Co., Ltd.) with acrylic acid (AAc, produced by Nippon Shokubai Co., Ltd.). 1-Methylheptyl acrylate was prepared by esterifying 1-methylheptyl alcohol (produced by Tokyo Chemical Industry Co., Ltd.) and acrylic acid (AAc, produced by Nippon Shokubai Co., Ltd.).

The obtained acrylic copolymer was diluted 50-fold with tetrahydrofuran (THF). The obtained dilution was filtered through a filter (material: polytetrafluoroethylene, pore size: 0.2 μm) to prepare a measurement sample. This measurement sample was fed to a gel permeation chromatograph (produced by Waters Corporation, 2690 Separations Model) and subjected to GPC measurement at a sample flow rate of 1 mL/min and a column temperature of 40° C. to measure the polystyrene equivalent molecular weight of the acrylic copolymer. Thus, the weight average molecular weight was determined.

(2) Production of Adhesive Tape

An isocyanate crosslinking agent (produced by Tosoh Corporation, CoronateL-45) was added to the obtained solution containing the acrylic copolymer such that the amount of the solids of the crosslinking agent was 0.5 parts by weight relative to 100 parts by weight of the acrylic copolymer, whereby an adhesive solution was prepared. The adhesive solution was applied to the release-treated surface of a release-treated PET film having a thickness of 75 µm such that the adhesive layer after drying would have a thickness of 50 µm, and then dried at 110° C. for five minutes. This adhesive layer was placed on the release-treated surface of a release-treated PET film having a thickness of 75 µm and left to stand at 40° C. for 48 hours, whereby an adhesive tape (non-support type) was obtained.

(3) Measurement of Gel Fraction of Adhesive Layer

The release film on one surface of the obtained adhesive tape was removed. The adhesive tape was attached to a PET film having a thickness of 23 µm (produced by Futamura Chemical Co., Ltd., FE2002) and cut to a 20 mm×40 mm flat rectangular shape. The release film on the other surface of the adhesive tape was removed, whereby a specimen was prepared. The weight of the specimen was measured. The specimen was immersed in ethyl acetate at 23° C. for 24 hours, taken out of the ethyl acetate, and dried at 110° C. for 1 hour. The weight of the specimen after drying was measured, and the gel fraction was calculated by the following equation (1).

$$\text{Gel fraction (\% by weight)} = 100 \times (W_2 - W_0)/(W_2 - W_0) \quad (1)$$

($W_0$: the weight of the substrate (PET film), $W_1$: the weight of the specimen before immersion, $W_2$: the weight of the specimen after immersion and drying)

Examples 2 to 11 and Comparative Examples 1 to 7

An adhesive tape was obtained as in Example 1 except that the type and compounding amount of the acrylic monomers constituting the acrylic copolymer and the compounding amount and type of the tackifier resins and the crosslinking agents were changed as shown in Table 1.

In Comparative Example 2, n-butyl acrylate (BA, produced by Mitsubishi Chemical Corporation) was used. In Example 7, 10 parts by weight of a terpene phenolic resin A, 10 parts by weight of a polymerized rosin ester resin B, and 10 parts by weight of a hydrogenated rosin ester resin C were used as tackifier resins. The tackifier resins used were the following bio-derived tackifier resins.

Terpene phenolic resin A (produced by Yasuhara Chemical Co., Ltd., G150, softening point: 150° C., bio-derived carbon content 67% by weight)

Polymerized rosin ester resin B (hydroxy value: 46, softening point: 152° C., bio-derived carbon content 95% by weight)

Hydrogenated rosin ester resin C (produced by Arakawa Chemical Industries Ltd., KE359, hydroxy value: 40, softening point: 100° C., bio-derived carbon content 95% by weight)

Examples 12 and 13

An adhesive tape was obtained as in Example 1 except that the weight average molecular weight of the acrylic copolymer was changed as shown in Table 2.

<Evaluation>

The adhesive tapes obtained in the examples and the comparative examples were evaluated by the following methods. Tables 1 and 2 show the results.

(1) Peeling Force for Rough Surfaces

The 180° peeling force of each of the adhesive tapes for water-proof abrasive paper (produced by Noritake Coated Abrasive Co., Ltd., C947H, grain size 360, surface roughness Ra=10.8 µm) as a rough surface was measured in conformity with JIS Z 0237:2009.

Specifically, first, the back surface of the water-proof abrasive paper was bonded to a SUS304 plate using an adhesive tape for measurement (produced by Sekisui Chemical Co., Ltd., #560). Next, one surface (the side not to be measured) of the adhesive tape was backed with a polyethylene terephthalate film having a thickness of 23 µm (produced by Futamura Chemical Co., Ltd., FE2002) and then the backed adhesive tape was cut to a size of 25 mm wide×75 mm long to prepare a specimen. This specimen was placed on the abrasive surface of the water-proof abrasive paper bonded to the SUS304 plate, with its adhesive layer (the side to be measured) facing the abrasive surface. A 2-kg rubber roller was then moved back and forth once on the specimen at a speed of 300 mm/min to bond the specimen and the abrasive paper. The specimen was then left to stand at 23° C. and a humidity of 50% for 20 minutes to prepare a test sample. The adhesive tape and the SUS plate of the test sample were peeled apart in the 180° direction at a tensile speed of 300 mm/min in conformity with JIS Z 0237:2009 at 23° C. and a humidity of 50%, and the peeling force (N/25 mm) was measured.

The peeling force for rough surfaces was evaluated as "○" (Good) when the peeling force was 10 N/25 mm or greater. The peeling force for rough surfaces was evaluated as "x" (Poor) when the peeling force was less than 10 N/25 mm.

The surface roughness Ra of the water-proof abrasive paper was measured using a laser microscope (produced by KEYENCE, Color 3D Laser Microscope, VK-8710).

(2) Shear Holding Power at High Temperature

The holding power of the adhesive tapes according to Examples 1, 12, and 13 was measured. Table 2 shows the results. The shear holding power of each adhesive tape at high temperature was measured in conformity with JIS Z 0237:2009.

Specifically, first, one surface (the side not to be measured) of the adhesive tape was backed with a polyethylene terephthalate film (produced by Futamura Chemical Co., Ltd., FE2002) having a thickness of 23 µm. The adhesive tape was then cut to a size of 25 mm wide×75 mm long to prepare a specimen. This specimen was placed on a SUS304-2B plate (2 mm thick, 50 mm wide, and 80 mm long) with the adhesive layer (the side to be measured) facing the SUS304-2B plate. Then, a 2-kg rubber roller was moved back and forth once on the specimen at a speed of 300 mm/min to bond the specimen to the SUS304-2B plate. The specimen was then left to stand for 20 minutes at 23° C. and a humidity of 50%. Thus, a test sample was produced. This test sample was placed in an environment at 80° C. and a humidity of 50% and left to stand for 15 minutes. A 1-kg weight was then attached to the polyethylene terephthalate film of the test sample such that a load in a shear direction was applied in conformity with JIS Z 0237:2009. One hour after the weight was attached, the amount of slippage of the adhesive layer in the shear direction from the position where it was bonded to the SUS304-2B plate was measured.

The shear holding power at high temperature was evaluated as "○" (Good) when the amount of slippage was 0.5 mm or less. The shear holding power at high temperature was evaluated as "Δ" (Fair) when the amount of slippage was greater than 0.5 mm.

TABLE 1

|  |  |  | Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Adhesive layer | Acrylic copolymer [parts by weight] | n-Heptyl acrylate (C7) | 30 | 93.9 | 94.89 | 84.9 | 74.9 | 64.9 | 93.9 | 74 | 65 |
|  |  | 1-Methylheptyl acrylate | 1 | 1 | 0.01 | 10 | 20 | 30 | 1 | 20 | 20 |
|  |  | n-Butyl acrylate (BA) | — | — | — | — | — | — | — | — | — |
|  |  | 2-Ethylhexyl acrylate (2-EHA) | 63.9 | — | — | — | — | — | — | — | — |
|  |  | Isobornyl acrylate (IBOA) | — | — | — | — | — | — | — | — | — |
|  |  | Acrylic acid (AAc) | 5 | 5 | 5 | 5 | 5 | 5 | 5 | 1 | 5 |
|  |  | 2-Hydroxyethyl acrylate (2-HEA) | 0.1 | 0.1 | 0.1 | 0.1 | 0.1 | 0.1 | 0.1 | 5 | 10 |
|  | Tackifier resin (TF) [parts by weight] |  | — | — | — | — | — | — | 30 | — | — |
|  | Crosslinking agent [parts by weight] |  | 0.5 | 0.5 | 0.5 | 0.5 | 0.5 | 0.5 | 2 | 0.5 | 0.5 |
|  | Weight average molecular weight of acrylic copolymer (Mw) [×10$^4$] |  | 96 | 112 | 115 | 107 | 105 | 103 | 112 | 102 | 99 |
|  | Gel fraction of adhesive layer [% by weight] |  | 32 | 35 | 36 | 35 | 34 | 33 | 33 | 47 | 55 |
| Evaluation | Adhesion to rough surfaces | N/25 mm | 10.2 | 10.9 | 10.3 | 11.3 | 13.7 | 10.1 | 16.2 | 11.5 | 10.6 |
|  |  | Rating | ○ | ○ | ○ | ○ | ○ | ○ | ○ | ○ | ○ |

|  |  |  | Example |  | Comparative Example |  |  |  |  |  |  |
|---|---|---|---|---|---|---|---|---|---|---|---|
|  |  |  | 10 | 11 | 1 | 2 | 3 | 4 | 5 | 6 | 7 |
| Adhesive layer | Acrylic copolymer [parts by weight] | n-Heptyl acrylate (C7) | 55 | 57 | — | — | 54.9 | — | 94.9 | 54.9 | — |
|  |  | 1-Methylheptyl acrylate | 20 | 1 | — | — | 40 | 94.9 | — | 40 | 10 |
|  |  | n-Butyl acrylate (BA) | — | — | — | 94.9 | — | — | — | — | — |
|  |  | 2-Ethylhexyl acrylate (2-EHA) | — | — | 94.9 | — | — | — | — | — | 84.9 |
|  |  | Isobornyl acrylate (IBOA) | — | 40 | — | — | — | — | — | — | — |
|  |  | Acrylic acid (AAc) | 5 | 1 | 5 | 5 | 5 | 5 | 5 | 5 | 5 |
|  |  | 2-Hydroxyethyl acrylate (2-HEA) | 20 | 1 | 0.1 | 0.1 | 0.1 | 0.1 | 0.1 | 0.1 | 0.1 |
|  | Tackifier resin (TF) [parts by weight] |  | — | — | — | — | — | — | — | — | — |
|  | Crosslinking agent [parts by weight] |  | 0.5 | 0.5 | 0.5 | 0.5 | 0.5 | 0.5 | 0.5 | 0.5 | 0.5 |
|  | Weight average molecular weight of acrylic copolymer (Mw) [×10$^4$] |  | 105 | 91 | 92 | 121 | 99 | 101 | 118 | 100 | 78 |
|  | Gel fraction of adhesive layer [% by weight] |  | 68 | 44 | 31 | 38 | 33 | 32 | 33 | 35 | 31 |
| Evaluation | Adhesion to rough surfaces | N/25 mm | 10.2 | 12.6 | 9.3 | 8.7 | 9.0 | 8.9 | 9.1 | 8.8 | 9.1 |
|  |  | Rating | ○ | ○ | x | x | x | x | x | x | x |

TABLE 2

|  |  |  | Example |  |  |
|---|---|---|---|---|---|
|  |  |  | 1 | 12 | 13 |
| Adhesive layer | Acrylic copolymer [parts by weight] | n-Heptyl acrylate (C7) | 30 | 30 | 30 |
|  |  | 1-Methylheptyl acrylate | 1 | 1 | 1 |
|  |  | n-Butyl acrylate (BA) | — | — | — |
|  |  | 2-Ethylhexyl acrylate (2-EHA) | 63.9 | 63.9 | 63.9 |
|  |  | Isobornyl acrylate (IBOA) | — | — | — |
|  |  | Acrylic acid (AAc) | 5 | 5 | 5 |
|  |  | 2-Hydroxyethyl acrylate (2-HEA) | 0.1 | 0.1 | 0.1 |
|  | Tackifier resin (TF) [parts by weight] |  | — | — | — |
|  | Crosslinking agent [parts by weight] |  | 0.5 | 0.5 | 0.5 |
| Weight average molecular weight of acrylic copolymer (Mw) [×10$^4$] |  |  | 96 | 40 | 50 |
| Gel fraction of adhesive layer [% by weight] |  |  | 32 | 21 | 24 |
| Evaluation | Adhesion to rough surfaces | N/25 mm | 10.2 | 11.5 | 11.2 |
|  |  | Rating | ○ | ○ | ○ |
|  | Shear holding power at high temperature | Amount of slippage [mm] | 0.2 | 0.7 | 0.5 |
|  |  | Rating | ○ | Δ | ○ |

INDUSTRIAL APPLICABILITY

The present invention can provide an adhesive tape capable of exhibiting excellent adhesion to rough surfaces. The present invention can also provide a method for fixing an electronic device component or an in-vehicle device component using the adhesive tape and a method for producing an electronic device or an in-vehicle device.

The invention claimed is:

1. An adhesive tape comprising
an adhesive layer containing an acrylic copolymer,
the acrylic copolymer containing 93.9% by weight or more of a structural unit derived from n-heptyl (meth) acrylate and 0.01% by weight or more and 6.1% by weight or less of a structural unit derived from 1-methylheptyl (meth)acrylate.

2. The adhesive tape according to claim 1,
wherein the acrylic copolymer further contains a structural unit derived from a (meth)acrylate containing an alkyl group having a carbon number of 8 or greater which differs from the structural unit derived from 1-methylheptyl (meth)acrylate, and
in the acrylic copolymer, an amount of the structural unit derived from a (meth)acrylate containing an alkyl group having a carbon number of 8 or greater is 6.09% by weight or less and greater than 0% by weight.

3. The adhesive tape according to claim 1,
wherein the acrylic copolymer further contains a structural unit derived from a monomer whose homopolymer has a glass transition temperature of −35° C. or higher.

4. The adhesive tape according to claim 3,
wherein the acrylic copolymer contains 5% by weight or more and 6.09% by weight or less of the structural unit derived from a monomer whose homopolymer has a glass transition temperature of −35° C. or higher.

5. The adhesive tape according to claim 1,
wherein the acrylic copolymer further contains a structural unit derived from a monomer containing a crosslinkable functional group.

6. The adhesive tape according to claim 5,
wherein the acrylic copolymer contains 0.01% by weight or more and 6.09% by weight or less of the structural unit derived from a monomer containing a crosslinkable functional group.

7. The adhesive tape according to claim 5,
wherein the monomer containing a crosslinkable functional group comprises a monomer containing a hydroxy group, and the acrylic copolymer contains 0.01% by weight or more and 6.09% by weight or less of a structural unit derived from the monomer containing a hydroxy group.

8. The adhesive tape according to claim 1,
wherein the acrylic copolymer has a weight average molecular weight of 200,000 or greater and 2,000,000 or less.

9. The adhesive tape according to claim 1,
wherein the adhesive layer further contains a tackifier resin.

10. The adhesive tape according to claim 1,
wherein the adhesive layer does not contain a surfactant.

11. The adhesive tape according to claim 1,
wherein the adhesive layer has a gel fraction of 10% by weight or more and 70% by weight or less.

12. The adhesive tape according to claim 1,
wherein the adhesive layer has a bio-derived carbon content of 10% by weight or more.

13. The adhesive tape according to claim 1, used for fixing an electronic device component or an in-vehicle device component.

14. A method for fixing an electronic device component or an in-vehicle device component, comprising
adhering an electronic device component or an in-vehicle device component to a substrate using the adhesive tape according to claim 1.

15. An electronic device or an in-vehicle device comprising an electronic device component or an in-vehicle device component adhered to a substrate using the adhesive tape according to claim 1.

* * * * *